United States Patent Office 3,496,033
Patented Feb. 17, 1970

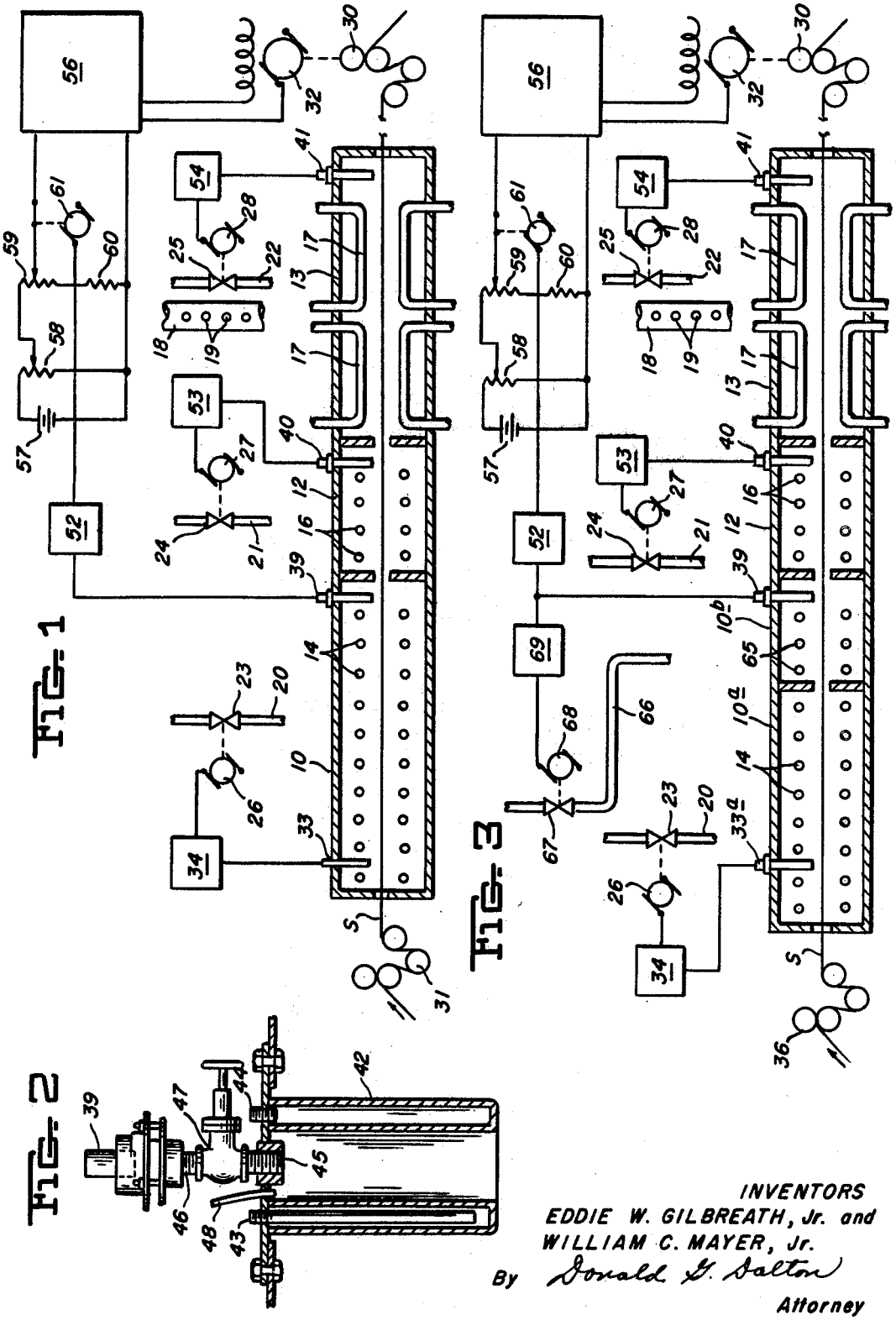

3,496,033
METHOD AND APPARATUS FOR CONTROLLING ANNEALING FURNACES
Eddie W. Gilbreath, Jr., Monroeville Borough, Pa., and William C. Mayer, Jr., Birmingham, Ala., assignors to United States Steel Corporation, a corporation of Delaware
Continuation-in-part of application Ser. No. 625,262, Mar. 22, 1967. This application June 5, 1967, Ser. No. 643,526
Int. Cl. C21d 1/26, 1/34
U.S. Cl. 148—13                    5 Claims

ABSTRACT OF THE DISCLOSURE

A method and apparatus for controlling a continuous annealing furnace for metal strip. The strip temperature is continuously sensed. A speed regulator is connected to the sensing means to adjust the speed at which the strip travels through the furnace to maintain it at a predetermined temperature. The temperature in the final cooling chamber also is controlled, and optionally the heat input to the other chambers.

---

This application is a continuation-in-part of our earlier application Ser. No. 625,262, filed Mar. 22, 1967 now abandoned.

The invention relates to an improved method and apparatus for controlling the temperature of metal strip in a continuous annealing furnace.

A conventional continuous annealing furnace includes heating, holding and cooling chambers through which metal strip travels in succession. The heating and holding chambers have heating elements which bring the strip to its annealing temperature and hold it at this temperature for the proper time. The cooling chamber has pipes through which a cooling medium (usually air) circulates to cool the strip to its proper finishing temperature. Reference can be made to Wilson Patent No. 2,120,319 for an exemplary showing of a furnace of this type, and to Krahe et al. Patent No. 2,832,711 for a description of annealing cycles used heretofore. Normalizing furnaces are similar except that the holding chamber may be eliminated.

It is known to equip continuous annealing furnaces with automatic controls which sense the temperature of each chamber and regulate the heat input to maintain desired temperatures. Previous controls with which we are familiar respond rather slowly, and have not been capable of holding the strip at the proper temperature when its characteristics change. There is a considerable lag before a change in the heat input actually corrects a deviation in strip temperature. A strip which has a bright surface absorbs less heat than a strip which has a dull surface. Random changes sometimes occur in the strip thickness, and more heat is required to raise a thicker strip to a given temperature than a thinner strip. Although different strips may be processed with corresponding parts of the furnace at the same temperatures, a brighter or thicker strip does not reach as high a temperature. Reference can be made to Kerr Patent No. 2,628,830 for a showing of one form of control previously known.

An object of our invention is to provide an improved control method and apparatus which overcome the foregoing difficulties, that is, which operate from the actual strip temperature instead of the furnace temperature, and which rapidly correct any deviations from the desired temperature.

A further object is to provide a control method and apparatus which vary the strip speed, as well as the heat input, thereby achieving a more rapid response than that afforded by varying the heat input alone.

A further object is to provide an improved control apparatus which attains the foregoing advantages, yet utilizes commercially available instruments and can be installed readily on existing furnaces.

In the drawing:
FIGURE 1 is a diagrammatic vertical longitudinal sectional view of a continuous annealing furnace equipped with our control apparatus;
FIGURE 2 is a vertical sectional view of a preferred pyrometer mounting embodied in the apparatus; and
FIGURE 3 is a view similar to FIGURE 1, but showing a modification.

FIGURE 1 shows diagrammatically a conventional continuous annealing furnace which includes a heating chamber 10, a holding chamber 12, and a cooling chamber 13. The heating and holding chambers 10 and 12 have sets of heating elements 14 and 16 respectively. The cooling chamber 13 has pipes 17 through which a cooling medium circulates. The medium is introduced through a duct 18 which contains a set of heating elements 19 for tempering the medium. We have illustrated the heating elements 14 and 16 as gas-fired radiant tubes, and heating elements 19 also as gas-fired, although electrical elements would be equivalent. Fuel is supplied to the sets of heating elements 14, 16 and 19 through pipes 20, 21 and 22 respectively. These pipes contain adjustable valves 23, 24 and 25 respectively operated by motors 26, 27 and 28, whereby the fuel input to the different sets of heating elements can be adjusted individually. The furnace contains an appropriate annealing atmosphere, commonly a mixture of nitrogen and hydrogen. The furnace of course includes suitable manifolds which connect the pipes and heating elements, as well as fans and dampers for regulating flow of cooling medium. Since a showing of such parts is not needed for an understanding of our invention, we have omitted them in the interest of simplicity.

A drive bridle 30 is located outside the cooling chamber 13, and a tensioning bridle 31 outside the heating chamber 10. A variable speed motor 32 operates the drive bridle, which pulls a continuous metal strip S through the furnace. The tensioning bridle is interlocked with the drive bridle through conventional equipment (not shown) to maintain the strip under proper tension within the furnace. In the example of a continuous galvanizing operation, the galvanizing equipment is located between the drive bridle and the furnace. In the heating chamber 10 the heating elements 14 heat the strip to a predetermined annealing temperature, commonly within the range of about 1000 to 1500° F. In the holding chamber 12 the heating elements 16 maintain the strip at this temperature about 5 seconds. In the cooling chamber 13, the strip cools to a proper finishing temperature. For example, steel strip which goes immediately to a continuous galvanizing pot may cool to a temperature of about 900° F. Strip which simply discharges in an annealed condition cools to a much lower temperature, commonly about 200° F. Since both the furnace and the annealing process are conventional, no more detailed description is deemed necessary. The aforementioned Wilson and Krahe et al. patents show a typical furnace and process to which we can apply our control, but it is apparent our invention is not thus limited.

We follow the conventional practice of maintaining the heating chamber 10 at a temperature close to the maximum which the equipment can withstand. Since the strip enters the furnace cold, the hotter the furnace the sooner the strip reaches its annealing temperature. To prevent damage, the heating chamber contains a temperature-sensing device 33, for example a thermocouple, which we connect to a recorder-controller 34. We connect the latter to the motor 26 which adjusts valve 23. We set the recorder-controller to the temperature we wish to maintain in the heating chamber, and it automatically actuates the motor to adjust the valve to maintain this temperature. Numerous alternatives are possible in the temperature-sensing device, such as a radiation pyrometer, as hereinafter described, which may be focused on one of the heating elements 14 or on the strip.

In practicing our invention, we employ radiation pyrometers 39, 40 and 41 to sense the strip temperature in the heating chamber 10, holding chamber 12 and cooling chamber 13 respectively. We prefer to locate these pyrometers near the exit ends of the chambers in order to attain maximum precision. FIGURE 2 shows a preferred mounting for pyrometer 39 to enable it to sense strip temperature unaffected by chamber temperature. The mountings of pyrometers 40 and 41 are similar. The mounting includes a cylindrical double-walled metal sleeve 42 which depends from the furnace roof to within a few inches of the strip surface. We cool the sleeve with water which enters the space between walls via an inlet 43 and discharges via an outlet 44. We support the pyrometer 39 above the top of the sleeve on a pair of aligned couplings 45 and 46 and a gate valve 47 between couplings. When the pyrometer requires servicing, we close the gate valve and remove the pyrometer from the coupling. The sleeve has an inlet 48 through which we charge the interior with an atmosphere similar to that of the furnace. The dimensions of the sleeve are such that radiation from the furnace walls does not reach the pyrometer. The interior walls of the sleeve have a non-reflecting surface, such as a layer of carbon black.

We connect the pyrometers 39, 40 and 41 to recorder-controllers 52, 53 and 54 respectively. We connect the recorder-controllers 53 and 54 in turn to the motors 27 and 28 which operate valves 24 and 25 in the fuel supply pipes. We set the recorder-controllers individually to the temperature we wish to maintain in the strip opposite each pyrometer. The recorder-controllers automatically actuate the motors to adjust the valves as needed to maintain the temperature to which they are set. In thus controlling the heat input to chambers 12 and 13, our arrangement is similar to that used heretofore, except that we sense the actual strip temperature instead of that of he chamber walls. We connect a speed regulator 56 to motor 32 which operates the drive bridle 30. The recorder-controller 52 operates the speed regulator 56 through a circuit which includes a power source 57, a manually operated speed adjusting rheostat 58, a motor-driven potentiometer 59, and a fixed resistor 60. We connect the recorder-controller 52 to the arm of potentiometer 59 through a motor 61. The greater the resistance between the power source 57 and the speed regulator 56, the slower the speed of motor 32. The motor would run at its maximum speed when the resistances of rheostat 58 and potentiometer 59 are completely shunted, and at zero speed when the full resistances are in series with the speed regulator.

Conventionally the furnace has a "rated line speed," although this speed can be exceeded. For example, at the rated speed the strip may travel at 300 feet per minute, yet the furnace may be capable of operating with the strip traveling at 350 feet per minute. We set rheostat 58 to a given fraction of the rated speed at which we wish the strip to travel, for example 50 percent. The speed controller 56 automatically regulates the speed of motor 32 so that the strip travels at this fraction of the rated speed when the arm of potentiometer 59 is in its mid-position. As long as the strip remains at the desired temperature, it continues to travel at this speed. If the strip temperature rises, the recorder-controller 52 acts through motor 61 to diminish the resistance of potentiometer 59, whereupon the strip begins to travel faster. Since the strip now stays in the cooling chamber 13 for a shorter time, a greater cooling effect is needed. Consequently the recorder-controller 54 lowers the heat input to duct 19 to diminish the temperature of the cooling medium circulating through pipes 17. The reverse action takes place if the strip temperature drops. If the change in strip temperature persists into the holding chamber 12, the recorder-controller 53 automatically adjusts the heat input to this chamber.

FIGURE 3 shows our control applied to a modified type of furnace. The heating chamber is divided into two sections 10a and 10b, the latter of which is relatively short. Section 10a is operated in a manner similar to that already described for the heating chamber 10 of the embodiment shown in FIGURE 1, except that we have shown a radiation pyrometer 33a used as the temperature-sensing element. Section 10b has heating elements 65 which are supplied with fuel separately through a pipe 66. This pipe contains an adjustable valve 67 operated by a motor 68. We connect a second recorder-controller 69 to the radiation pyrometer 39, and connect this recorder-controller to motor 68. The recorder-controller 69 does not act immediately, but only after a delay and a fairly large temperature change. If the strip changes temperature by a sufficiently large increment (for example 10° F.), the recorder-controller 69 makes an adjustment in the quantity of fuel going to the heating elements 65. In this way, we attain even greater precision. In other respects the modification is similar to the embodiment already described; hence we do not repeat the description.

We have not shown or described the individual instruments embodied in our apparatus for the reason that they are known and available commercially. One example of a suitable optical pyrometer is the L and N "Rayotube," available from Leeds and Northrup Company, Philadelphia, Pa. One example of a suitable recorder-controller is the L and N "D.A.T.," Model S, Type G, available from the same supplier. One example of a suitable speed regulator is the General Electric "SCR."

From the foregoing description, it is seen that our invention affords a simple method and apparatus for automatically maintaining proper conditions in a continuous annealing furnace. We correct deviations from the desired strip temperature much sooner by adjusting the strip speed. Formerly it has been considered necessary for strip to travel through a galvanizing bath at a substantially constant speed to produce a coating of uniform thickness. With conventional techniques in which coating rolls are used, it has been found possible to vary the speed at least plus or minus 20 percent and still produce a uniform coating. Any speed adjustments made by our apparatus normally are within this range. The range can be much broader when an air knife is used to control the coating thicknesses, as shown, for example in Hunter et al. application Ser. No. 613,474, filed Feb. 2, 1967, of common ownership. It is apparent also that we can apply our invention readily to existing furances without otherwise altering the structure.

We claim:
1. In a continuous annealing process in which:
   a metal strip travels through a furnace having heating, holding and cooling chambers in succession;
   heat is applied to said heating chamber to raise the strip temperature to the annealing temperature;
   heat is applied to said holding chamber to hold the strip at its annealing temperature for a minimum length of time;
   a cooling medium circulates through said cooling chamber to lower the strip temperature to a predetermined finishing temperature; and
   heat is applied to said cooling medium to temper its cooling effect on the strip;
   the improvement which comprises:

sensing the temperature of the strip near the exit end of said heating chamber;

adjusting the speed at which the strip travels through the furnace in accordance with the temperature thus sensed to maintain the strip at a predetermined temperature at the location of sensing; and adjusting the heat applied to said cooling medium to diminish the temperature of the cooling medium when the speed increases and raise the temperature of the cooling medium when the speed decreases.

2. A method as defined in claim 1 in which the strip temperature is sensed also near the exit end of said cooling chamber, and adjustments in the heat applied to said cooling medium are in accordance with the temperature sensed in said cooling chamber.

3. A method as defined in claim 2 in which the strip temperature is sensed also near the exit end of said holding chamber, and the heat applied to said holding chamber is adjusted in accordance with the temperature sensed therein.

4. In a continuous annealing installation which comprises:

a furnace having heating, holding and cooling chambers;

a drive bridle for pulling a metal strip through said chambers in succession;

a motor operatively connected with said bridle;

means for applying heat to said heating chamber to raise the strip temperature to the annealing temperature;

means for applying heat to said holding chamber to hold the strip at its annealing temperature for a minimum length of time;

means for circulating a cooling medium through said cooling chamber to lower the strip temperature to a predetermined finishing temperature; and means operatively connected with said circulating means for applying heat to the cooling medium to temper its cooling effect on the strip;

the combination therewith of an improved control apparatus comprising:

means for sensing the temperature of the strip near the exit end of said heating chamber;

means operatively connected with said sensing means and with said motor for adjusting the speed at which the strip travels through said furnace in accordance with the temperature thus sensed to maintain the strip at a predetermined temperature at the location of sensing;

means for sensing the temperature of the strip also near the exit end of said cooling chamber; and means operatively connected with said second-named sensing means and with said means for applying heat to the cooling medium to diminish the temperature of the cooling medium when the speed increases and raise the temperature of the cooling medium when the speed decreases.

5. A combination as defined in claim 4 in which said control apparatus further comprises means for sensing the temperature of the strip near the exit end of said holding chamber, and means operatively connected with said last-named means for adjusting the heat applied to said holding chamber.

References Cited

UNITED STATES PATENTS

| | | | |
|---|---|---|---|
| 2,518,905 | 8/1950 | Kniveton | 263—3 |
| 2,676,008 | 4/1954 | Munker | 263—3 |
| 2,872,173 | 2/1959 | Munker | 263—6 |

RICHARD O. DEAN, Primary Examiner

U.S. Cl. X.R.

148—14, 16.7, 20.3, 128, 134, 157; 266—3; 263—3

UNITED STATES PATENT OFFICE
CERTIFICATE OF CORRECTION

Patent No. 3,496,033                                  February 17, 1970

Eddie W. Gilbreath, Jr., et al.

It is certified that error appears in the above identified patent and that said Letters Patent are hereby corrected as shown below:

Column 2, after line 53, insert -- ture for a specified time, for example, a minimum of --; line 64, cancel "ture for a specified time, for example, a minimum".

Signed and sealed this 8th day of December 1970.

(SEAL)

Attest:

Edward M. Fletcher, Jr.                            WILLIAM E. SCHUYLER, JR.

Attesting Officer                                          Commissioner of Patents